United States Patent
Manlove et al.

(10) Patent No.: US 6,175,299 B1
(45) Date of Patent: Jan. 16, 2001

(54) ANALOG SIGNAL PROCESSING SYSTEM FOR DETERMINING AIRBAG DEPLOYMENT

(75) Inventors: Gregory Jon Manlove; Walter Kirk Kosiak; Richard Joseph Ravas; Jiyao Liu, all of Kokomo, IN (US)

(73) Assignee: Delco Electronics Corporation, Kokomo, IN (US)

( * ) Notice: Under 35 U.S.C. 154(b), the term of this patent shall be extended for 0 days.

(21) Appl. No.: 08/610,021

(22) Filed: Mar. 4, 1996

(51) Int. Cl.[7] ........................................ B60Q 1/00
(52) U.S. Cl. ................ 340/436; 340/429; 340/903; 280/735; 280/734; 180/268; 701/301
(58) Field of Search .................. 364/424.055, 424.056, 364/424.01, 424.03; 340/426, 429, 665, 669, 903; 280/735, 734; 180/268

(56) References Cited

U.S. PATENT DOCUMENTS

| | | | |
|---|---|---|---|
| 5,285,187 | * | 2/1994 | Hirao et al. ........................ 340/436 |
| 5,436,838 | * | 7/1995 | Miyamori ....................... 364/424.05 |
| 5,445,413 | * | 8/1995 | Rudolf et al. ....................... 280/735 |
| 5,657,831 | * | 8/1997 | Furui .................................. 340/436 |
| 5,788,273 | * | 8/1998 | Jeenicke et al. .................... 280/735 |
| 5,790,404 | * | 8/1998 | Faye et al. .................... 364/424.055 |

* cited by examiner

*Primary Examiner*—Daryl Pope
(74) *Attorney, Agent, or Firm*—Jimmy L. Funke

(57) ABSTRACT

An analog signal processing system for determining airbag deployment includes a first low pass filter receiving a conditioned analog accelerometer signal and providing an analog acceleration signal therefrom. A first comparator/latch circuit receives the analog acceleration signal and provides a first signal to a logic circuit. The analog acceleration signal is further provided to a first integrator which converts the signal to a first velocity signal and provides the first velocity signal to a second comparator/latch circuit which provides a second logic level signal to the logic circuit. A second low pass filter receives the analog acceleration signal and provides a low frequency analog acceleration signal to a third comparator/latch circuit which provides a third signal to the logic circuit. The low frequency analog acceleration signal is further received by a second integrator circuit which converts the signal to a second velocity signal and provides the second velocity signal to a fourth comparator/latch circuit which provides a fourth signal to the logic circuit. The logic circuit performs a logic operation on the various logic level signals to provide an airbag deployment signal therefrom. Each comparator/latch circuit has a comparator threshold value associated therewith provided by a threshold circuit. The system is enabled for a preset time period after detecting a predefined acceleration level to provide a time-independent analog algorithm for evaluating the analog acceleration signal for possible airbag deployment.

32 Claims, 6 Drawing Sheets

ANALOG SIGNAL PROCESSING SYSTEM FOR DETERMINING AIRBAG DEPLOYMENT

FIELD OF THE INVENTION

The present invention relates generally to techniques for processing analog signals, and more specifically to systems for processing analog accelerometer signals for determining airbag deployment.

BACKGROUND OF THE INVENTION

Airbag systems are commonly used in automotive applications to provide protection for the vehicle operator and/or passenger in the event of a vehicular collision. A popular technique for implementing an airbag system includes detecting vehicular acceleration via an accelerometer and then evaluating the resulting acceleration signal to determine whether an impact of sufficient severity has occurred to require the airbag to deploy.

Most acceleration-based airbag systems utilize a microprocessor to evaluate the acceleration signal. As is known in the art, such microprocessor use permits evaluation algorithms to be easily implemented in software. In so doing, the input analog acceleration signal is converted to a digital word, and all subsequent signal processing by the microprocessor is implemented digitally.

An example of one known microprocessor-based system for evaluating an acceleration signal is shown in FIG. 1 as system 10. Referring to FIG. 1, system 10 includes an accelerometer 12 which may be a micro-machined piezoresistive sensor whose differential analog output voltage (S+−S−=$V_{IN}$) is proportional to the applied acceleration. The differential acceleration signals S+ and S− are applied to signal conditioning circuitry 14 via signal lines 16 and 18, respectively. The signal conditioning circuitry typically includes a gain stage and temperature compensation circuitry, and provides a conditioned acceleration signal $V_{OUT}$ at output 20. A microprocessor 24 is provided to evaluate $V_{OUT}$ and includes an input 22 connected to output 20 via signal path 26. Microprocessor 24 receives the conditioned analog acceleration signal $V_{OUT}$, converts the analog signal to a digital signal, and implements a software algorithm to evaluate the digital signal and determine whether the airbag should be deployed. Microprocessor 24 then controls airbag deployment circuitry via signal path 28.

Software algorithms for evaluating acceleration signals to determine airbag deployment may be implemented in a number of ways. A conventional approach is to use a time-dependent algorithm wherein the algorithm begins when a predefined level of acceleration is exceeded. With the time-dependent approach, the digital acceleration signal is digitally integrated within microprocessor 24, and the resulting predetermined velocity curve is evaluated against a predetermined curve to determine if a deploy event has occurred. Referring to FIG. 2, this approach is shown graphically. FIG. 2 shows a plot of velocity versus time wherein curve 30 represents the maximum velocity allowed before a deploy is required, and curve 40 represents a velocity below which a deploy event should not occur and below which system 10 is reset. The break points and relative slopes of curves 30 and 40 can be adjusted by software to optimize system 10 for various vehicular applications. Additional breakpoints and slopes can be added, so long as there is sufficient memory in microprocessor 24 to store such data.

The foregoing microprocessor-based system and implementation thereof has a number of drawbacks. First, system 10 is designed around a process optimized for digital circuits, which requirements are inconsistent with the requirements for processing of analog signals such as those provided by analog accelerometer 12. Second, microprocessors are typically large and complicated integrated circuits, resulting in significant cost and area penalties for the circuit and system designers. Third, variations in the accuracy of accelerometer 12, along with the finite resolution of the data converter of microprocessor 24, requires curves 30 and 40 of FIG. 2 to be some minimum distance apart. This limits the accuracy of the algorithm and may delay a deployment of the airbag beyond the time when deployment should actually occur. Moreover, the finite resolution of the data converter of microprocessor 24 introduces error into the algorithm which can be cumulative, and in some cases unacceptable. Fourth, most low cost microprocessors process data at a relatively slow rate. This limits the number of break points and slopes which can be used in a time-dependent algorithm, which may then result in missing important information which occurs at too rapid a rate for the digital system to handle (known in the art as aliasing).

To avoid the foregoing drawbacks of a microprocessor-based acceleration signal evaluating system, it is desirable to implement an analog signal processing system for evaluating the analog acceleration signal. However, implementation of a time-dependent analog algorithm is a difficult task and very area intensive in the design of integrated circuitry to accomplish such an algorithm. What is therefore needed is an analog signal processing system implementing a time-independent algorithm to thereby eliminate or minimize the resolution constraints associated with data converters, and significantly reduce timing uncertainty and aliasing problems. An added benefit of implementing a time-independent algorithm is that it avoids secondary events, such as hitting a curb, for example, having any effect on the analog deployment algorithm.

SUMMARY OF THE INVENTION

The forgoing shortcomings of the prior art are addressed by the present invention. In accordance with one aspect of the present invention, an analog signal processing system for determining an airbag deployment signal from an analog acceleration signal comprises means for converting the analog acceleration signal to a first analog velocity signal, means for providing a first deployment signal if the first analog velocity signal exceeds a first analog reference signal, and means responsive to said first deployment signal for generating the airbag deployment signal.

In accordance with another aspect of the present invention, an analog signal processing system for determining an airbag deployment signal from an analog acceleration signal comprises a first analog signal processing circuit having a first analog reference signal associated therewith corresponding to a first velocity level, wherein the first circuit receives the analog acceleration signal and provides a first analog velocity signal corresponding thereto. The first circuit further provides a first output signal if the first analog velocity signal exceeds the first analog reference signal, and otherwise provides a second output signal. A logic circuit receives the first and second output signals and performs a logic operation thereon to provide the airbag deployment signal.

In accordance with yet another aspect of the present invention, a time independent method of determining an airbag deployment signal from an analog acceleration comprises the steps of: converting the analog acceleration signal to a first analog velocity signal; comparing the first analog velocity signal to a first analog reference signal corresponding to a first velocity and providing a first output signal if the first analog velocity signal exceeds the first analog reference signal and otherwise providing a second output signal; and performing a logic operation upon the first and second output signals and providing the airbag deployment signal therefrom.

One object of the present invention is to provide an analog signal processing system for determining airbag deployment conditions, wherein the system does not require or include a digital computer or similar digital signal processing arrangement.

Another object of the present invention is to provide a time-independent method of processing analog acceleration signals to determine airbag deployment conditions.

These and other objects of the present invention will become more apparent from the following description of the preferred embodiment.

DESCRIPTION OF THE PREFERRED EMBODIMENT

Figure 1:
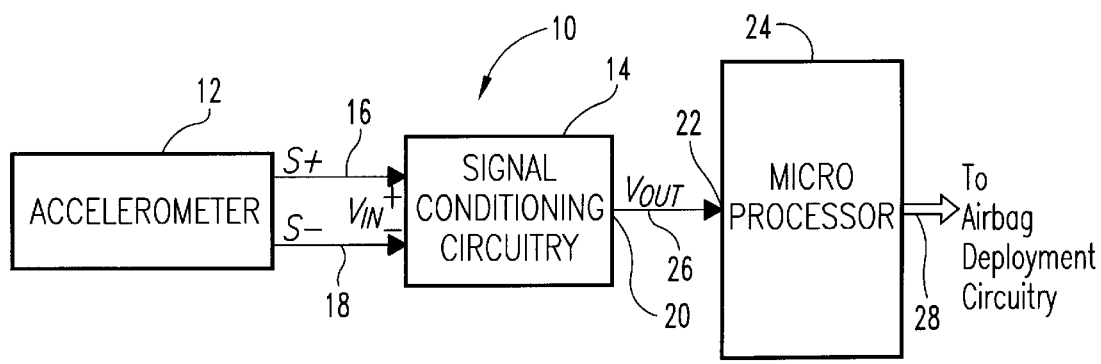
FIG. 1 is a diagrammatic illustration of a prior art system for evaluating analog acceleration signals utilizing a digital microprocessor.
Figure 2:
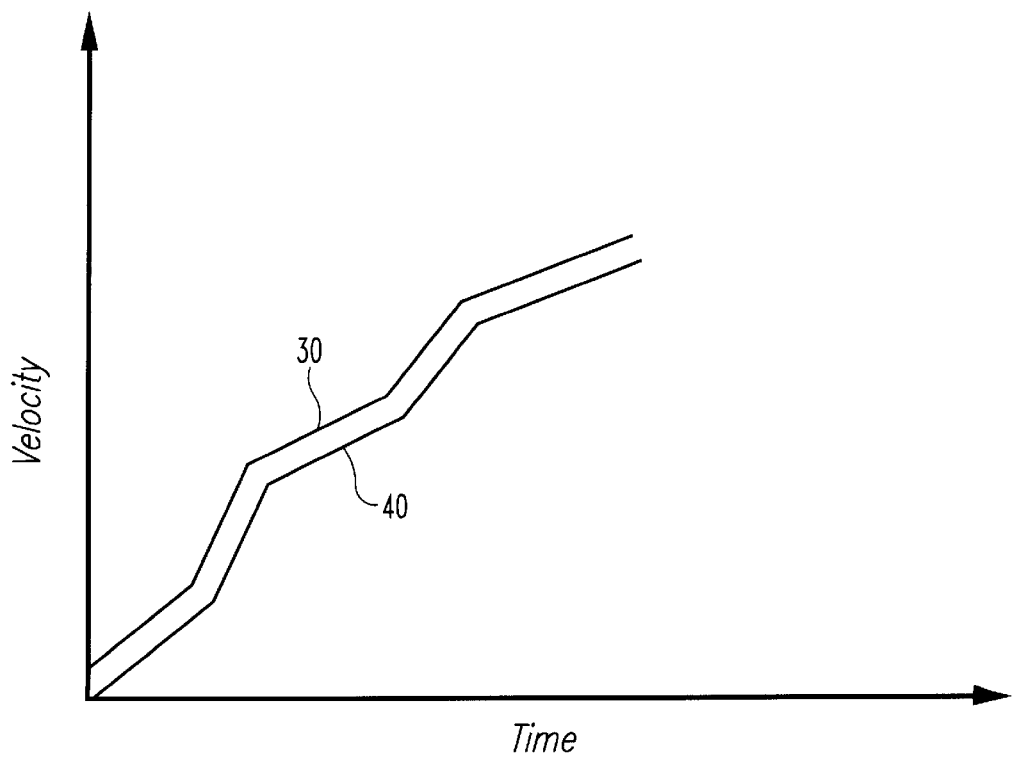
FIG. 2 is a plot illustrating a prior art time dependent algorithm utilized by the system of FIG. 1 in evaluating acceleration signals.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
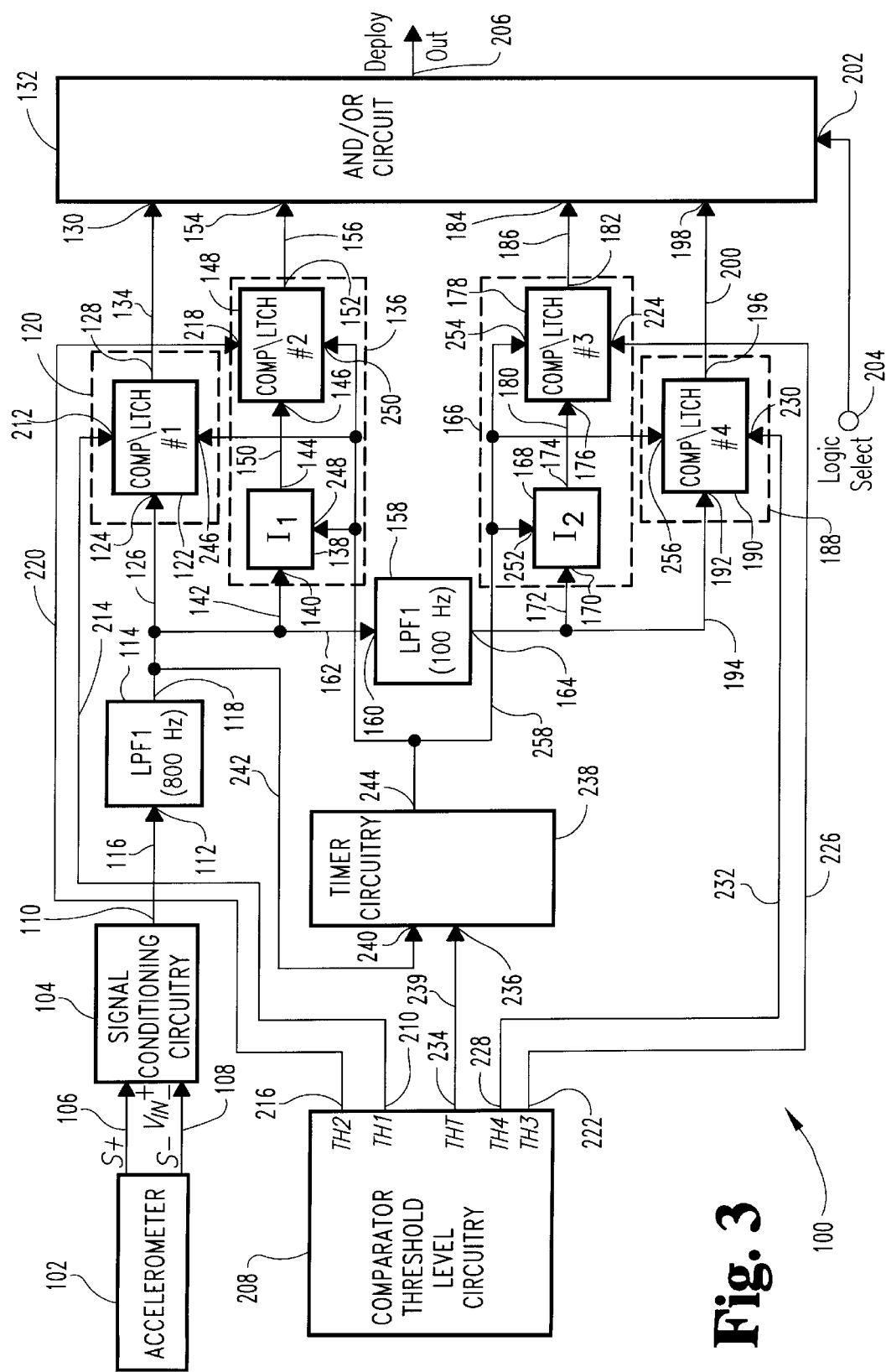
FIG. 3 is a diagrammatic illustration of one embodiment of an analog signal processing system for determining airbag deployment, in accordance with the present invention.

Referring now to FIG. 3, a diagrammatic illustration of one embodiment of an analog signal processing system 100 for determining airbag deployment, in accordance with the present invention, is shown. System 100 includes an accelerometer 102 connected to signal conditioning circuitry 104 via signal paths 106 and 108. Accelerometer 102 is responsive to acceleration to provide a differential acceleration signal, S+ and S−, corresponding thereto. Preferably, accelerometer 102 is a bulk micro-machined piezoresistive sensor, although the present invention contemplates that any acceleration sensor may be used having a differential output that is proportional to the applied acceleration. Signal conditioning circuity 104 is operable to receive differential acceleration signals S+ and S− as an input voltage $V_{IN}$, where $V_{IN}=(S+-S-)$, and provide a conditioned analog acceleration signal at output 110 corresponding thereto. Preferably, signal conditioning circuitry 104 includes signal amplifying circuitry having an adjustable gain associated therewith, along with compensation circuitry for minimizing undesirable components of the differential analog acceleration signal, such as those due to acceleration-independent offsets, temperature, circuit fabrication variations, and the like. One example of such signal conditioning circuitry 104 designed for use with system 100 is described in U.S. patent application Ser. No. 08/610,007, and entitled "Analog/Digital Feedback Circuitry for Minimizing Offset Variations in an Analog Signal", which is assigned to the assignee of the present invention, and which patent application is herein incorporated by reference.

System 100 further includes a low pass filter 114 having an input 112 connected to the output 110 of signal conditioning circuity 104 via signal path 116. Low pass filter 114 is operable to remove undesired resonant frequency effects from the conditioned analog acceleration signal provided by signal conditioning circuitry 104, which undesirable resonant frequency effects typically occur beyond 1.5 kHz in a piezoresistive sensor. Preferably, low pass filter 114 is a second-order 800 Hz switched capacitor low pass filter, although the present invention contemplates that the cut off frequency of low pass filter 114 may be set at any frequency below the undesirable resonant frequency. Low pass filter 114 includes an output 118 from which low pass filter 114 provides the analog acceleration signal suitable for evaluation by the remaining analog signal processing components of system 100.

In evaluating the analog acceleration signal provided by low pass filter 114, system 100 includes a number of analog signal processing circuits that may be used by system 100 in various combinations thereof, as will be fully described hereinafter, to generate an airbag deployment signal therefrom. One such analog signal processing circuit 120 preferably includes a comparator/latch circuit 122 having an input 124 connected to the output 118 of low pass filter 114 via signal path 126. Comparator/latch circuit 122 further includes an output 128 connected to an input 130 of AND/OR circuit 132 via signal path 134. The details of comparator/latch circuit 122 will be more fully described hereinafter with respect to FIG. 5.

Another analog signal processing circuit 136 is connected to the output 118 of low pass filter 114 via signal path 142. Preferably, analog signal processing circuit 136 includes an analog signal integrating circuit 138 of known construction, having an input thereto 140 connected to output 118 of low pass filter 114 via signal path 142. An output 144 of analog signal integrating circuit 138 is connected to an input 146 of comparator/latch circuit 148 via signal path 150. Comparator/latch circuit 148 has an output 152 connected to a second input 154 of AND/OR circuit 132 via signal path 156. Preferably, comparator/latch circuit 48 is identical to comparator/latch circuit 120, the details of which will be fully described hereinafter.

Output 118 of low pass filter 114 is further connected to an input 160 of a second low pass filter 158 via signal path 162. Preferably, low pass filter 158 is designed to have a lower cut off frequency than low pass filter 114, so that low pass filter 158 receives the analog acceleration signal from low pass filter 114 and provides a low frequency representation thereof. In one embodiment, low pass filter 158 is a first-order 100 Hz switched capacitor low pass filter, although the present invention contemplates that the cut off frequency of low pass filter 158 may be designed to be any frequency lower than the cut off frequency of low pass filter 114, to thereby provide a low frequency representation of the analog acceleration signal at output 164 thereof.

The low frequency representation of the analog acceleration signal is applied to analog signal processing circuit 166 via signal path 172. Preferably, analog signal processing circuit 166 is identical to analog signal processing circuit 136 in that the low frequency representation of the analog acceleration signal is applied to an input 170 of an analog signal integrating circuit 168 of known construction. An output 174 of analog signal integrating circuit 168 is connected to an input 176 of a comparator/latch circuit 178 via signal path 180. Comparator/latch circuit 178 has an output 182 connected to a third input 184 of AND/OR circuit 132 via signal path 186. Preferably, analog signal integrating circuit 168 is identical to analog signal integrating circuit 138, and comparator/latch circuit 178 is identical to comparator/latch circuits 120 and 148.

The low frequency representation of the analog acceleration signal provided at the output 164 of low pass filter 158 is further provided to analog signal processing circuit 188 via signal path 194. Analog signal processing circuit 188 preferably includes a comparator/latch circuit 190 having an input 192 thereto connected to output 164 of low pass filter 158 via signal path 194. Comparator/latch circuit 190 has an output 196 connected to a fourth input 198 of AND/OR circuit 132 via signal path 200. Preferably, comparator/latch circuit 190 is identical to comparator/latch circuits 120, 148, and 178.

As will be described in further detail hereinafter, any combination of output signals provided by the foregoing analog signal processing circuits can be used to generate the airbag deployment signal. A preferred way of combining the output signals is to provide AND/OR circuit 132 with a logic select input 202 connected to an external source of a logic select signal, represented by open connection 204. AND/OR circuit 132 is responsive to the level of the logic select signal to provide either an AND function or an OR function, with respect to the analog signal processing circuit output signals received at inputs 130, 154, 184, and 198. Thus, AND/OR circuit may be configured to provide the airbag deployment signal at a deploy output 206 thereof, which is either an ANDed version of the output signals of analog digital processing circuits 120, 136, 166, and/or 188, or an ORed version thereof. Although AND/OR circuit 132 is preferably responsive to one of a low level and high level logic select input signal at input 202 thereof to provide either an AND function or an OR function, the present invention contemplates that circuit 132 may further be responsive to any one of a plurality of logic select input signal levels at logic select input 202 to perform any one of a corresponding plurality of separate logic operations upon the output signals of the various analog signal processing circuits to thereby generate the airbag deployment signal therefrom. Such plurality of logic functions may include, but are not limited to, inversion, NAND, NOR, exclusive-OR, exclusive-NOR, and/or any combination thereof.

As will be more fully described hereinafter, each of the comparator/latch circuits 120, 148, 178, and 190 has an analog reference threshold level associated therewith, which analog reference threshold levels are preferably provided by comparator threshold level circuitry 208. Comparator threshold level circuitry 208 includes a TH1 output 210 connected to a reference signal input 212 of comparator/latch circuit 122 via signal path 214, a TH2 output 216 connected to a reference signal input 218 of comparator/latch circuit 148 via signal path 220, a TH3 output 222 connected to a reference signal input 224 of comparator/latch circuit 178, and a TH4 output 228 connected to a reference signal input 230 of comparator/latch circuit 190 via signal path 132. The reference threshold level signals provided at outputs 210, 216, 222, and 228 are each analog reference signals operable to provide a switching threshold reference signal to each of the foregoing comparator/latch circuits. Preferably, comparator threshold level circuitry 208 is a digital-to-analog (D/A) converter of known construction and responsive to digital input signals thereto to provide corresponding analog reference signals therefrom at outputs 210, 216, 222, and 228. However, the present invention further contemplates that other known analog circuits may be used to provide the foregoing analog reference signals, which circuits may include, for example, resistor divider networks.

Preferably, system 100 has a timer reset associated therewith, and system 100 operation is not initiated until a predetermined acceleration threshold has been detected. System 100 is thereafter only active for a predetermined period of time, and if a deploy event has not occurred within the predetermined period of time, system 100 is held in reset until the predetermined acceleration threshold is again detected. In one embodiment, the predetermined time period that system 100 is active after determining that the predetermined acceleration threshold has been detected is set at approximately 35 milliseconds, although the present invention contemplates that system 100 may be provided with a wide range of active time periods. Specifically, the predetermined active time period may be set extremely small such that system 100 effectively samples the analog acceleration signal provided by low pass filter 114, or may be set to run continuously such that system 100 is always active. The present invention contemplates that the active time period of system 100 may be set anywhere between the foregoing limits to provide the system designer with added flexibility.

In implementing the foregoing timing reset function, system 100 includes a timer circuit 238 having an input 240 connected to the output 118 of low pass filter 114 via signal path 242. Timer circuit 238 includes an additional input 236 connected to a THT output 234 of comparator threshold level circuitry 208 via signal path 239. Timer circuit 238 further includes an output 244 connected to circuit enable inputs 246 of comparator/latch 122, 248 of analog signal integrating circuit 138, 250 of comparator/latch circuit 148, 252 of analog signal integrating circuit 168, 254 of comparator/latch circuit 178, and 256 of comparator/latch circuit 190. As will be more fully described with respect to FIG. 4, timer circuit 238 receives the analog acceleration signal provided by low pass filter 114 and an analog reference signal provided by comparator threshold level circuitry 208, and provides a circuit enable output signal at output 244 thereof to thereby enable comparator/latch 122, analog signal integrating circuit 138, comparator/latch 148, analog signal integrating circuit 168, comparator/latch 178, and comparator/latch 190 for the predetermined time period discussed above when the analog acceleration signal exceeds a predetermined acceleration threshold level.

Figure 4:
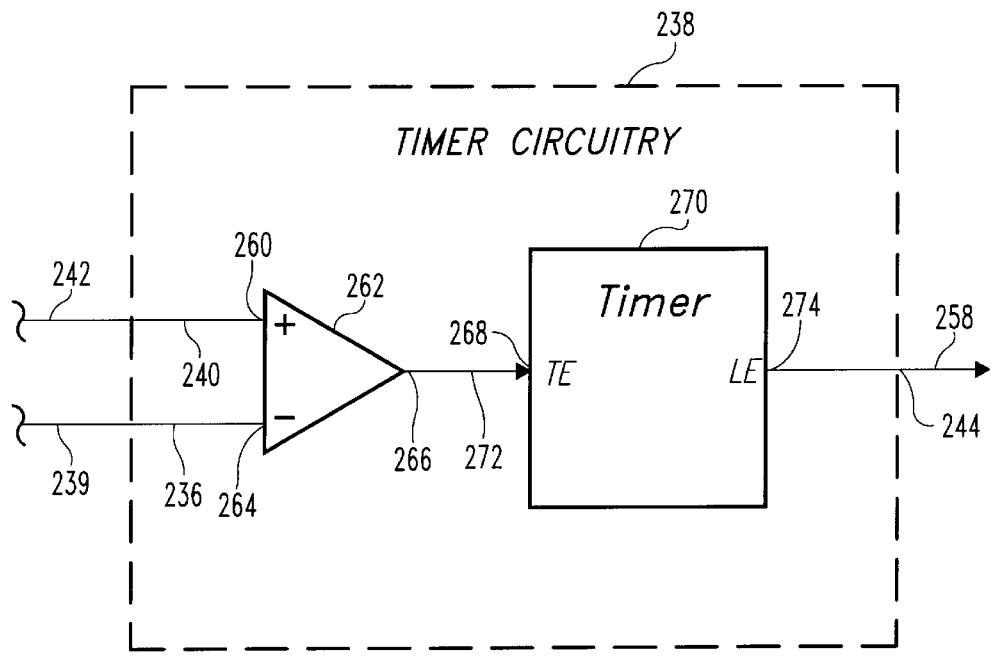
FIG. 4 is a diagrammatic illustration showing the details of the timer circuitry of FIG. 3.

Referring now to FIG. 4, one embodiment of timer circuit 238 is shown. Input line 240, connected to signal path 242, is preferably connected to a non-inverting input 260 of a comparator 262 of known construction. Similarly, input 236, connected to signal path 239, is connected to an inverting input 264 of comparator 262. An output 266 of comparator 262 is connected to a timer enable input 268 of timer 270 via signal path 272. Timer 270, which may be of known construction, has a circuit enable output 274 which provides the aforementioned circuit enable signal at output 244 connected to signal path 258. In operation, comparator 262 is responsive to the analog acceleration signal provided at output 118 of low pass filter 114, and to the analog reference signal provided on signal path 239 by comparator threshold level circuitry 208, to provide a low level signal at output 266 when the analog reference signal exceeds the analog acceleration level, and to provide a high level output signal at output 266 when the analog acceleration signal exceeds the analog reference signal. Timer 270 is responsive to a high level timer enable signal at input 268 to provide a circuit enable signal at output 274 thereof. Timer 270 is operable, as is known in the art, to provide the circuit enable signal at output 274 for only a predetermined time period after receiving a high level timer enable signal at input 268 thereof. It is to be understood that although timer circuit 238 preferably includes a comparator 262 and timer 270, operable as described, the present invention contemplates that comparator 262 may be replaced by any known level-detecting circuit similarly responsive to the analog acceleration signal and analog reference signal provided on signal paths 242 and 239, respectively, to provide the timer enable signal.

Figure 5:
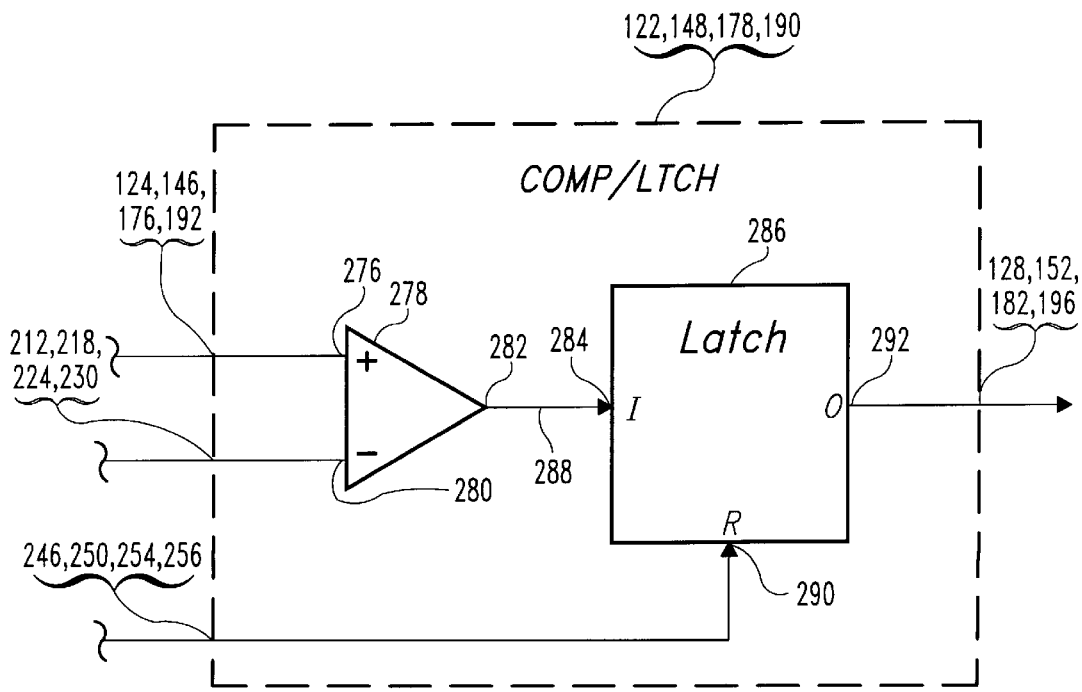
FIG. 5 is a diagrammatic illustration showing the details of the comparator/latch circuitry of FIG. 3.

Referring now to FIG. 5, one embodiment of a comparator/latch circuit, corresponding to any one of comparator/latch circuits 122, 148, 178, and 190, is shown. A first input, corresponding to one of inputs 124, 146, 176, or 192, is connected to a non-inverting input 276 of comparator 278, which may be of known construction. Similarly, a second input, corresponding to input 212, 218, 224, or 230, is connected to an inverting input 280 of comparator 278. An output 282 of comparator 278 is connected to an input 284 of latch circuit 286 via signal path 288. Latch circuit 286 may be of known construction, and includes a reset input 290 corresponding to one of inputs 246, 250, 254, or 256, which is connected to an enable input provided by timer circuit 238. Latch circuit 286 further includes an output 292 corresponding to any one of outputs 128, 152, 182, or 196. Comparator 278 is operable to provide a low level output signal at output 282 thereof when the analog reference signal at input 280 exceeds the analog signal at input 276, and to provide a high level output signal at output 282 thereof when the analog signal at input 276 exceeds the analog reference signal at input 280. When the latch circuit 286 is not in reset, corresponding to the condition that the latch circuit 286 is enabled, a high level output signal is provided at output 292 if, at any time that it is enabled, latch circuit 286 receives a high level input signal at input 284. If, during the time that latch circuit 286 is enabled, no high level input signal is received at input 284, latch circuit 286 will provide a low level output signal at output 292 thereof. During reset, corresponding to times at which latch circuit 286 is not enabled, latch circuit 286 provides a low level output signal at output 292 thereof. Thus, the comparator/latch circuit of FIG. 5 is operable, in a preferred embodiment thereof, to provide a high level output signal at output 292 only if the analog input signal, provided to any one of inputs 124, 146, 176, or 192, exceeds the analog reference signal provided at any one of corresponding inputs 212, 218, 224, or 230. In any other case, latch circuit 286 provides a low level output signal at output 292 thereof. Although the comparator/latch circuit of FIG. 5 is shown as preferably including a comparator 278 cooperatively arranged with a latch circuit 286 as described, those skilled in the art will recognize that the function of the comparator/latch circuit may be implemented with a variety of known circuits. One such circuit may include a known level detecting circuit operable to distinguish between relative levels of signals received at any one of inputs 124, 146, 176, and 192, and analog reference signals received at any one of corresponding inputs 212, 218, 224, or 230, and provide a high level output signal if one input signal exceeds the other, and to otherwise provide a low level signal. All such alternate circuit implementations for achieving the function described with respect to FIG. 5 are intended to fall within the scope of the present invention.

Those skilled in the art will recognize that any of the foregoing high/low level signal descriptions of the various comparator and latch circuits may be inverted without detracting from the scope of the present invention. For example, although comparator/latch circuit 122, according to the foregoing description, is operable to provide a high level signal at output 128 thereof only if the analog acceleration signal at input 124 exceeds the analog reference signal at input 212, comparator/latch circuit 122 can be easily modified such that a low level output signal is provided at output 128 thereof only if the analog acceleration signal at input 124 exceeds the analog reference signal at input 212.

Referring now to FIGS. 3–5, operation of system 100 will now be described in detail. The analog acceleration signal provided by low pass filter 114 is provided to input 124 of comparator/latch circuit 122, and analog reference signal TH1 provided by comparator threshold level circuitry 208 is provided to input 212 thereof. The analog reference signal TH1 applied to input 212 corresponds to a predetermined acceleration level, which may be any acceleration level between −500 g's and 500 g's. Thus, if the analog acceleration signal at input 124 exceeds the analog reference signal TH1, comparator/latch circuit 122 provides a high level signal to input 130 of AND/OR circuit 132.

The analog acceleration signal provided by low pass filter 114 is further applied to input 140 of analog signal integrating circuit 138. Analog signal integrating circuit 138 is operable to convert the analog acceleration signal provided by low pass filter 114 to an analog velocity signal. The analog velocity signal provided by analog signal integrating circuit 138 is provided to input 146 of comparator/latch circuit 148. A second analog reference signal TH2 is provided to input 218 of comparator/latch circuit 148. Analog reference signal TH2 corresponds to a predetermined velocity level, which may be set at any desired vehicle speed. Comparator/latch circuit 148 provides a high level signal to input 154 of AND/OR circuit 132 if the analog velocity signal provided by analog signal integrating circuit 138 exceeds the analog reference signal TH2.

The analog acceleration signal provided by low pass filter 114 is also applied to low pass filter 158, which provides a low frequency representation thereof. The low frequency representation of the analog acceleration signal is applied to input 170 of analog signal integrating circuit 168, which is operable to integrate the low frequency representation of the analog acceleration signal and provide an analog velocity signal corresponding thereto at output 174. The analog velocity signal provided by analog signal integrating circuit 168 is provided to input 176 of comparator/latch circuit 178, along with analog reference signal TH3. As with analog reference signal TH2, signal TH3 corresponds to a predetermined velocity level, which may be set at any desired vehicle speed. Comparator/latch circuit 178 provides a high level signal to input 184 of AND/OR circuit 132 if the analog velocity signal at input 176 thereof exceeds the analog reference signal TH3.

The low frequency representation of the analog acceleration signal is further applied to an input 192 of comparator/latch circuit 190. Analog reference signal TH4 is also applied thereto an input 230. As with the analog reference signal TH1, TH4 corresponds to a desired acceleration level, which acceleration level may be set anywhere between −500 g's and 500 g's. Comparator/latch circuit 190 provides a high level signal to input 198 of AND/OR circuit 132 only if the low frequency representation of the analog acceleration signal at input 192 thereof exceeds the analog reference signal TH4.

As previously described, timer circuit 238 is responsive to a predetermined level of acceleration to enable the circuitry of system 100 for a predetermined time period. Timer circuit 238 receives the analog acceleration signal provided by low pass filter 114 at input 240 thereof. An analog reference signal THT is provided at input 236 thereof. Analog reference signal THT corresponds to an acceleration level above which system 100 operation level is desirable, and below which system 100 operation should be reset. This acceleration level may be set anywhere between −500 g's and 500 g's, and in one embodiment is set at approximately 17 g's. Thus, if the analog acceleration signal provided by low pass filter 114 exceeds the analog reference signal THT, timer circuit 238 provides a circuit enable output signal at output 244 thereof, to thereby enable comparator/latch circuit 122, analog signal integrating circuit 138, comparator/latch circuit 148, analog signal integrating circuit 168, comparator/latch circuit 178, and comparator/latch circuit 190 for a predetermined time period.

Comparator threshold level circuitry 208 is preferably designed such that each of the comparator/latch circuits 122, 148, 178, and 190 have maximally adjustable thresholds associated therewith. Preferably, this threshold range is wide enough to permit each of the analog signal processing circuits 120, 136, 166, and 188 to be on all the time, off all the time, or have any operating threshold therebetween. Such adjustability provides the possibility of eliminating one or more of the various analog signal processing circuits 120, 136, 166, or 188 from the operation of system 100, if desired.

In accordance with the logic select signal applied at input 202 of AND/OR circuit 132, the signals at inputs 130, 154, 184, and 198 are either ANDed or ORed to provide the airbag deployment signal. The foregoing AND/OR function is intended to provide the system designer with flexibility in choosing a location to mount system 100 within a vehicle.

From the foregoing, it should now be apparent that since there is no use of time-dependent slopes in the implementation of system 100, the time-dependent problems of the digital algorithm described in the background of the invention are eliminated. The analog signal integrating circuits are preferably implemented with switched capacitor filter circuits which have a much greater resolution than a conventional 8 bit data converter. This minimizes the cumulative errors of the circuits, and especially those errors attributable to digital integrators. Low pass filters 114 and 118 are also preferably implemented with switched capacitor filter circuits, sampled at a 48 microsecond rate. This is a much faster processing rate than low-cost microprocessors can handle with any degree of algorithm complexity, which higher sampling rate minimizes aliasing problems and time delays associated with digital systems as previously described. The analog signal processing system 100 thus implements a low-cost impact sensing algorithm having superior performance over its digital signal processing predecessors.

With the possible exception of accelerometer 102, each of the system 100 components are intended to be fabricated on a single integrated circuit. Although any suitable fabrication process may be used in forming such an integrated circuit, a known BiCMOS process is preferably used.

EXAMPLES

Figure 6A:
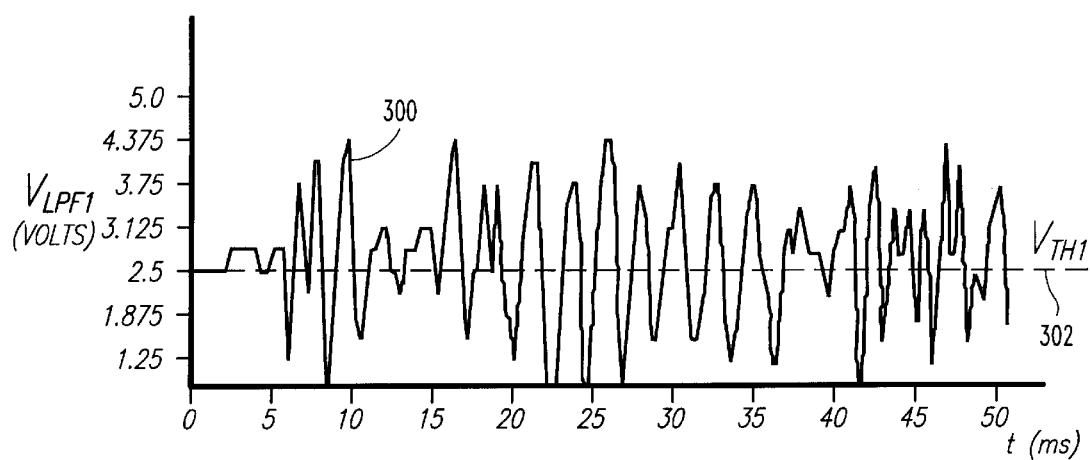
FIG. 6 is composed of FIGS. 6A–6D, and illustrates an example impact evaluated by the analog signal processing system of FIG. 3, which does not result in airbag deployment.
Figure 6B:
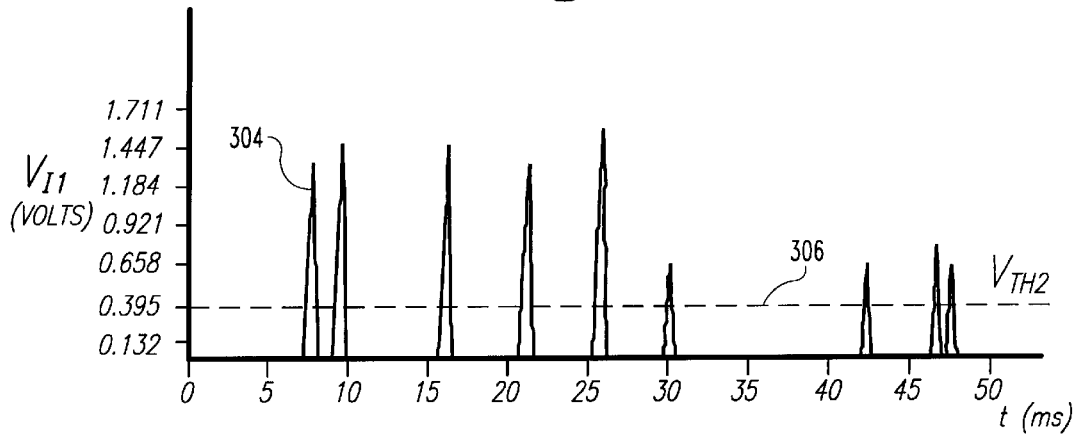

Referring now to FIG. 6, which is composed of FIGS. 6A–6D, an example is provided of an impact evaluated by system 100 of FIG. 3, which impact does not result in airbag deployment. Referring to FIG. 6A, a waveform of the analog acceleration signal 300 provided by low pass filter 114 is shown plotted versus time. In this embodiment, the analog reference signal TH1 302 is set at mid-supply such that it corresponds to a zero-g level. As such, comparator/latch circuit 122 is set such that it is permanently on. Referring now to FIG. 6B, the analog velocity signal 304 provided by analog signal integrating circuit 138 is shown plotted versus time. The analog reference signal TH2 306 is set at a low velocity level. Since the analog velocity signal 304 exceeds analog reference signal TH2, the comparator/latch circuit 148 latches, and a high level signal is provided at input 154 of AND/OR circuit 132.

Figure 6C:
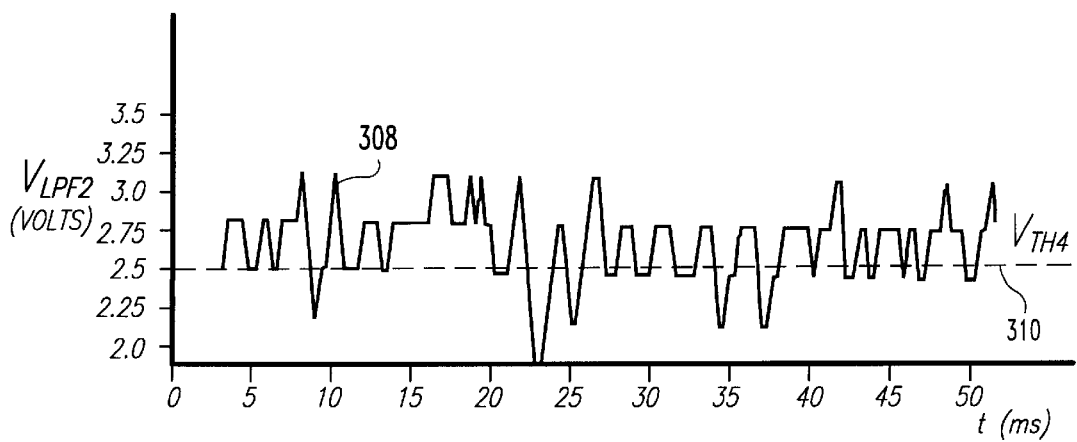
Figure 6D:
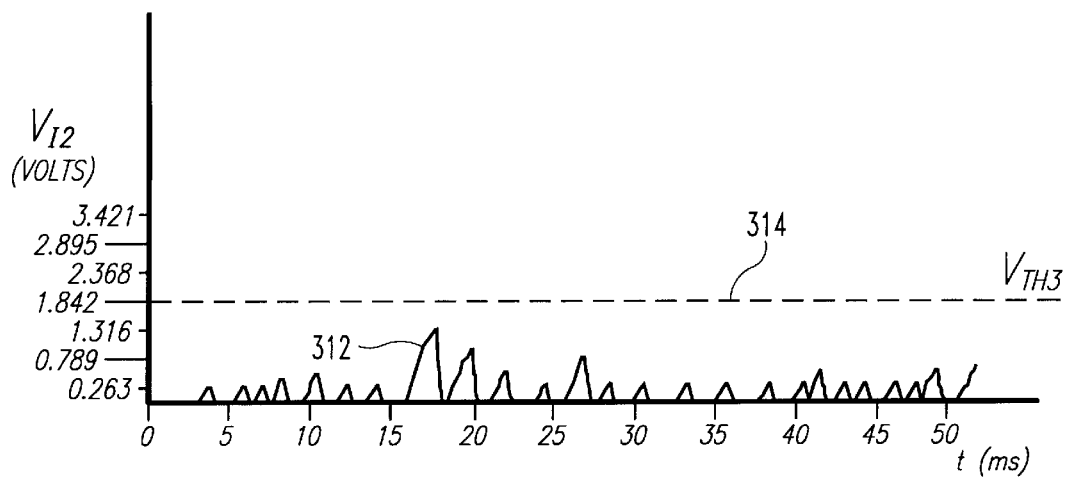

Referring now to FIG. 6C, the low frequency representation of the analog acceleration signal 308, provided by low pass filter 158, is shown plotted versus time. As with comparator/latch circuit 122, the analog reference signal TH4 of comparator/latch circuit 190 is set at a level corresponding to zero-g's. Thus, comparator/latch circuit 190 is on all the time, and provides a high level signal at input 198 of AND/OR circuit 132. Referring finally to FIG. 6D, the analog velocity signal 312 provided by analog signal integrating circuit 168 is shown plotted versus time. The analog reference signal TH3 314 is set such that it corresponds to a mid-level velocity. Since the analog velocity signal 312 does not exceed the analog reference signal TH3 314, comparator/latch circuit 176 provides a low level signal at input 184 of AND/OR circuit 132. If AND/OR circuit 132 is configured to provide the AND function, then the impact event of FIGS. 6A–6D results in a low level deploy out signal at output 206 of AND/OR circuit 132, corresponding to a non-deploy event.

Figure 7A:
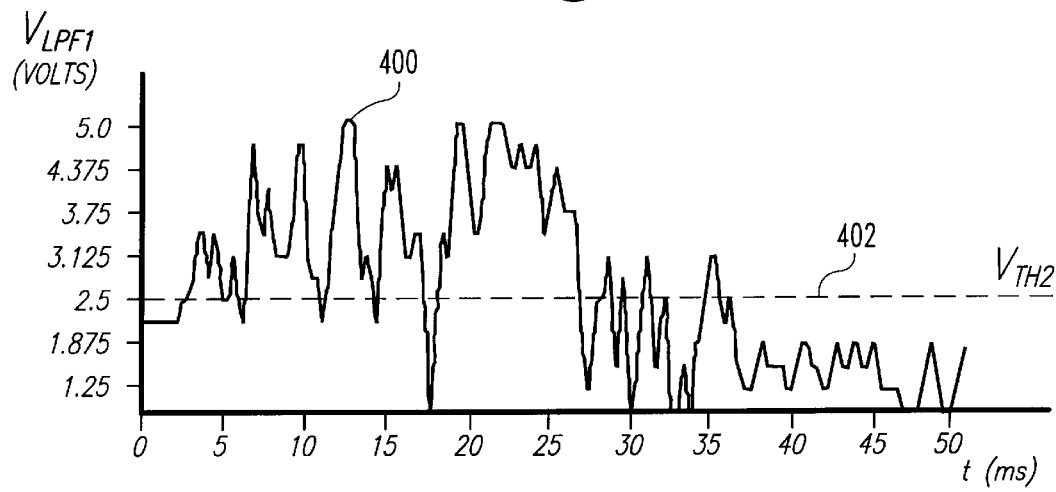
FIG. 7 is composed of FIGS. 7A–7D, and illustrates an example impact evaluated by the analog signal processing system of FIG. 3, which results in an airbag deployment.
Figure 7B:
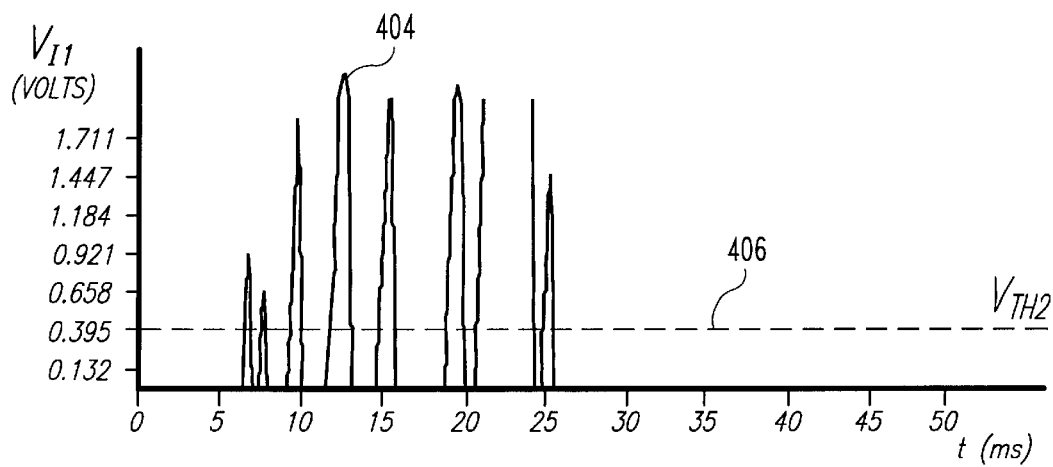

Referring now to FIGS. 7A–7D, example impact data is shown, which is evaluated by system 100 of FIG. 3, and results in an airbag deployment event. Referring specifically to FIG. 7A, the analog acceleration signal 400 provided by low pass filter 114 is shown plotted versus time. The analog reference signal TH1 is set at mid-supply, corresponding to a zero-g level. Comparator/latch circuit 122 is therefore on all the time, and provides a high level signal at input 130 of AND/OR circuit 132. Referring to FIG. 7B, the analog velocity signal 404 provided by analog signal integrating circuit 138 is shown plotted versus time. The analog reference signal TH2 406 is set such that it corresponds to a low velocity level. Since the analog velocity signal 404 exceeds analog reference signal TH2 406, comparator/latch circuit 148 provides a high level signal at input 154 of AND/OR circuit 132.

Figure 7C:
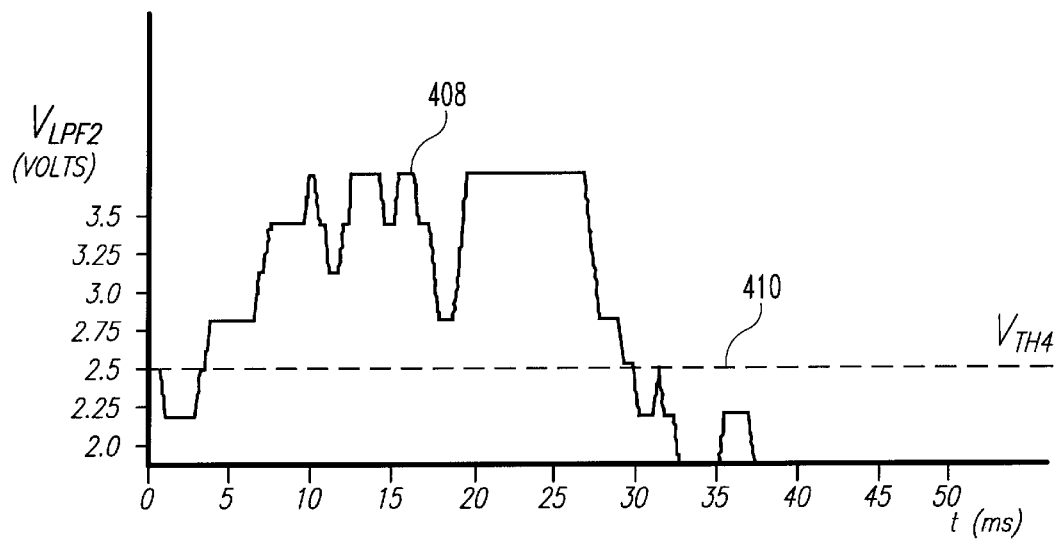
Figure 7D:
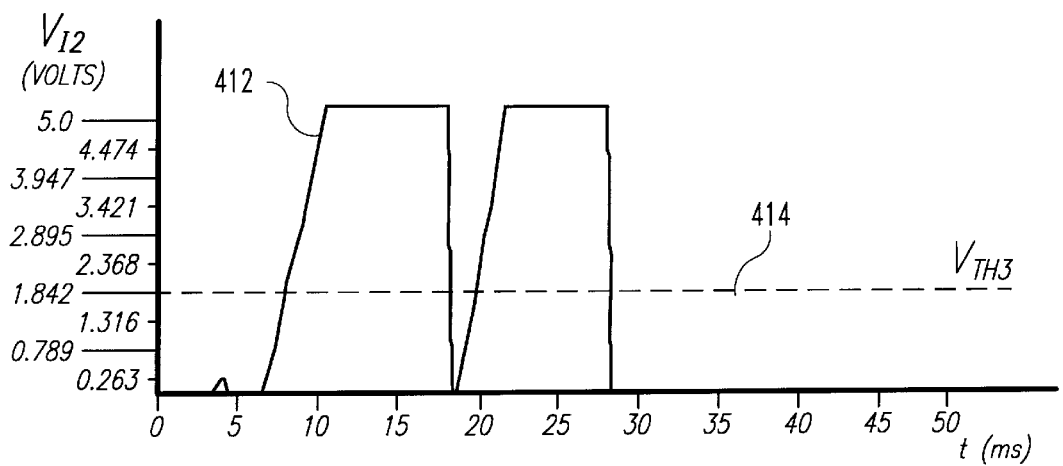

Referring to FIG. 7C, the low frequency representation of the analog acceleration signal provided by low pass filter 158 is shown plotted versus time. The analog reference signal TH4 410, like analog reference signal TH1 402, is set at mid-supply, corresponding to a zero-g level. As with comparator/latch circuit 122, comparator/latch circuit 190 is on all the time, and provides a high level signal at output 198 of AND/OR circuit 132. Referring finally to FIG. 7D, the analog velocity signal 412 provided by analog signal integrating circuit 168 is shown plotted versus time. The analog reference signal TH3 is set at a mid-velocity level 414. Since the analog velocity signal 412 exceeds the analog reference signal TH3, comparator/latch circuit 178 provides a high level signal to input 184 of AND/OR circuit 132. If AND/OR circuit 132 is configured for an AND function, and since the signals at inputs 130, 154, 184, and 198 are all high level, AND/OR circuit 132 provides a high level deploy out signal at output 206 thereof, corresponding to an airbag deployment event.

From the foregoing examples, it should now be appreciated that any single analog signal processing circuit 120, 136, 166, or 188, or any combination thereof, may be used to evaluate the analog acceleration signal provided by low pass filter 114 in generating an airbag deployment signal. In the preceding examples, analog signal processing circuits 120 and 188 were effectively disabled by configuring AND/OR circuit 132 to provide the AND function, and by ensuring that comparator/latch circuits 122 and 190 were on all the time. Thus, in the above examples, only the analog velocity signals were evaluated in determining whether a deployment event should occur.

While the invention has been illustrated and described in detail in the foregoing drawings and description, the same is to be considered as illustrative and not restrictive in character, it being understood that only the preferred embodiment has been shown and described and that all changes and modifications that come within the spirit of the invention are desired to be protected.

What is claimed is:

1. An analog signal processing system for generating an airbag deployment signal from an analog acceleration signal comprising:

means for converting the analog acceleration signal to a first analog velocity signal;

means for providing a first deployment signal if the first analog velocity signal exceeds a first analog reference signal independent of the analog acceleration signal; and means responsive to said first deployment signal for generating the airbag deployment signal.

2. The system of claim 1 further including means for providing a low frequency band representation of a conditioned analog acceleration signal, said low frequency band representation of said conditioned analog acceleration signal corresponding to the analog acceleration signal.

3. The system of claim 2 further including:

means responsive to acceleration for providing a differential analog acceleration signal corresponding thereto; and means responsive to said differential analog acceleration signal for providing said conditioned analog acceleration signal.

4. The system of claim 3 further including means for providing said first analog reference signal.

5. The system of claim 4 further including means for enabling said means for converting the analog acceleration signal to a first analog velocity signal and said means for providing a first deployment signal for a predetermined time period if the analog acceleration signal exceeds a second analog reference signal.

6. The system of claim 1 further including:

means for providing a low frequency band representation of the analog acceleration signal;

means for converting the low frequency band representation of the analog acceleration signal to a second analog velocity signal; and means for providing a second deployment signal if said second analog velocity signal exceeds a second analog reference signal, wherein said means responsive to said first deployment signal for generating the airbag deployment signal is further responsive to said second deployment signal for generating the airbag deployment signal.

7. The system of claim 6 further including means for providing a third deployment signal if the analog acceleration signal exceeds a third analog reference signal, wherein said means responsive to said first and second deployment signals for generating the airbag deployment signal is further responsive to said third deployment signal for generating the airbag deployment signal.

8. The system of claim 7 further including means for providing a fourth deployment signal if said low frequency band representation of the analog acceleration signal exceeds a fourth analog reference signal, wherein said means responsive to said first, second and third deployment signals for generating the airbag deployment signal is further responsive to said fourth deployment signal for generating the airbag deployment signal.

9. The system of claim 8 further including means for enabling said means for converting the analog acceleration signal to a first analog velocity signal, said means for converting the analog acceleration signal to a second analog velocity signal, said means for providing a first deployment signal, said means for providing a second deployment signal, said means for providing a third deployment signal, and said means for providing a fourth deployment signal for a predetermined time period if the analog acceleration signal exceeds a fifth analog reference signal.

10. The system of claim 9 further including means for providing said first, second, third, fourth and fifth analog reference signals.

11. The system of claim 1 further including means for providing a second deployment signal if the analog acceleration signal exceeds a second analog reference signal, wherein said means responsive to said first deployment signal for generating the airbag deployment signal is further responsive to said second deployment signal for generating the airbag deployment signal.

12. The system of claim 1 further including:

means for providing a low frequency band representation of the analog acceleration signal; and means for providing a second deployment signal if said low frequency band representation of the analog acceleration signal exceeds a second analog reference signal, wherein said means responsive to said first deployment signal for generating the airbag deployment signal is further responsive to said second deployment signal for generating the airbag deployment signal.

13. An analog signal processing system for generating an airbag deployment signal from an analog acceleration signal comprising:

a first analog signal processing circuit having a first analog reference signal associated therewith corresponding to a first velocity, said analog reference signal independent of the analog acceleration signal, said first circuit receiving the analog acceleration signal and providing a first analog velocity signal corresponding thereto; said first circuit further providing a first output signal if said first analog velocity signal exceeds said first analog reference signal, and otherwise providing a second output signal; and a logic circuit receiving said first and second output signals and performing a logic operation thereon to provide the airbag deployment signal.

14. The system of claim 13 wherein said first analog signal processing circuit includes:

a signal integrating circuit having an input receiving the analog acceleration signal and an output, said signal integrating circuit converting the analog acceleration signal to said first analog velocity signal;

a level detecting circuit having an input connected to said output of said signal integrating circuit and an output, said level detecting circuit providing said first output signal at said level detecting circuit output when said first analog velocity signal exceeds said first analog reference signal, and providing said second output signal at said level detecting circuit output when said first analog velocity signal is below said first analog reference signal; and a latch circuit having an input connected to said output of said level detecting circuit and an output, said latch circuit providing said first output signal at said latch circuit output if said level detecting circuit provides said first output signal to said latch circuit input, and otherwise providing said second output signal to said latch circuit output.

15. The system of claim 13 further including:

an analog signal filter receiving the analog acceleration signal and providing a low frequency analog acceleration signal corresponding thereto; and a second analog signal processing circuit having a second analog reference signal associated therewith corresponding to a second velocity, said second circuit receiving the low frequency analog acceleration signal and providing a second analog velocity signal corresponding thereto, said second circuit further providing a third output signal if said second analog velocity signal exceeds said second analog reference signal, and otherwise providing a fourth output signal, herein said logic circuit further receives said third and fourth output signals and performs a logic operation thereon to provide the airbag deployment signal.

16. The system of claim 15 wherein said second analog signal processing circuit includes:

a signal integrating circuit having an input receiving the low frequency analog acceleration signal and an output, said signal integrating circuit converting the low frequency analog acceleration signal to said second analog velocity signal;

a level detecting circuit having an input connected to said output of said signal integrating circuit and an output, said level detecting circuit providing said third output signal at said level detecting circuit output when said second analog velocity signal exceeds second analog reference signal, and providing said fourth output signal at said level detecting circuit output when said second analog velocity signal is below said second analog reference signal; and a latch circuit having an input connected to said output of said level detecting circuit and an output, said latch circuit providing said third output signal at said latch circuit output if said level detecting circuit provides said third output signal to said latch circuit input, and otherwise providing said fourth output signal to said latch circuit output.

17. The system of claim 15 further including a third analog signal processing circuit having a third analog reference signal associated therewith corresponding to a first acceleration level, said third circuit receiving the analog acceleration signal and providing a fifth output signal if the acceleration signal exceeds said third analog reference signal, and otherwise providing a sixth output signal, wherein said logic circuit further receives said fifth and sixth output signals and performs a logic operation thereon to provide the airbag deployment signal.

18. The system of claim 17 wherein said third analog signal processing circuit includes:

a level detecting circuit having an input receiving the analog acceleration signal and an output, said level detecting circuit providing said fifth output signal at said level detecting circuit output when said analog acceleration signal exceeds said third analog reference signal, and providing said sixth output signal at said level detecting circuit output when said analog acceleration signal is below said third analog reference signal; and a latch circuit having an input connected to said output of said level detecting circuit and an output, said latch circuit providing said fifth output signal at said latch circuit output if said level detecting circuit provides said fifth output signal to said latch circuit input, and otherwise providing said sixth output signal to said latch circuit output.

19. The system of claim 17 further including a fourth analog signal processing circuit having a fourth analog reference signal associated therewith corresponding to a second acceleration level, said fourth circuit receiving the low frequency analog acceleration signal and providing a seventh output signal if the low frequency acceleration signal exceeds said fourth analog reference signal, and otherwise providing an eighth output signal, wherein said logic circuit further receives said seventh and eighth output signals and performs a logic operation thereon to provide the airbag deployment signal.

20. The system of claim 19 wherein said fourth analog signal processing circuit includes:

a level detecting circuit having an input receiving the low frequency analog acceleration signal and an output, said level detecting circuit providing said seventh output signal at said level detecting circuit output when said analog acceleration signal exceeds said fourth analog reference signal, and providing said eighth output signal at said level detecting circuit output when said analog acceleration signal is below said fourth analog reference signal; and a latch circuit having an input connected to said output of said level detecting circuit and an output, said latch circuit providing said seventh output signal at said latch circuit output if said level detecting circuit provides said seventh output signal to said latch circuit input, and otherwise providing said eight output signal to said latch circuit output.

21. The system of claim 19 wherein said first, third, fifth and seventh output signals are each high level signals, and said second, fourth, sixth and eighth signals are each low level signals.

22. The system of claim 19 wherein each of said first, second, third and fourth analog signal processing circuits further includes a circuit enable input;

and wherein said system further includes an enabling circuit having a circuit enable output connected to each of said circuit enable inputs and a fifth analog reference signal associated therewith corresponding to a third acceleration level, said enabling circuit receiving the analog acceleration signal and providing a circuit enable signal to said circuit enable output for a predefined time period to thereby permit operation of each of said analog signal processing circuits if the analog acceleration signal exceeds said fifth analog reference signal.

23. The system of claim 19 wherein said third acceleration level is equal to said first acceleration level;

and wherein said fifth analog reference signal is equivalent to said third analog reference signal.

24. The system of claim 19 further including a reference signal circuit operable to provide said first, second, third, fourth and fifth analog reference signals.

25. The system of claim 19 wherein said logic circuit includes a logic select input, said logic circuit responsive to any one of a plurality of predefined signal levels at said logic select input to perform any one of a corresponding plurality of separate logic operations upon said output signals of said first, second, third and fourth analog signal processing circuits to provide the airbag deployment signal.

26. A time independent method of determining an airbag deployment signal from an airbag acceleration signal, the method comprising the steps of:

converting the analog acceleration signal to a first analog velocity signal;

comparing said first analog velocity signal to a first analog reference signal independent of the analog acceleration signal and corresponding to a first analog velocity, and providing a first output signal if said first velocity signal exceeds said first analog reference signal, and otherwise providing a second output signal; and performing a logic operation upon the first and second output signals and providing the airbag deployment signal therefrom.

27. The method of claim 26 further including the steps of:

passing the analog acceleration signal through a first low pass filter to provide a low frequency analog acceleration signal corresponding thereto;

converting the low frequency analog acceleration signal to a second analog velocity signal; and comparing said second analog velocity signal to a second analog reference signal corresponding to a second velocity and providing a third output signal if said second analog velocity signal exceeds said second analog reference signal, and otherwise providing a fourth output signal, and wherein the logic operation step further includes performing the logic operation upon the third and fourth output signals and providing the airbag deployment signal therefrom.

28. The method of claim 26 further including the step of comparing the analog acceleration signal to a second analog reference signal corresponding to a predetermined acceleration level and providing a third output signal if said analog acceleration signal exceeds said second analog reference signal, and otherwise providing a fourth output signal;

and wherein the logic operation step further includes performing the logic operation upon the third and fourth output signals and providing the airbag deployment signal therefrom.

29. The method of claim 26 further including the steps of:

passing the analog acceleration signal through a low pass filter to provide a low frequency analog acceleration signal corresponding thereto; and comparing the low frequency analog acceleration signal to a second analog reference signal corresponding to a predetermined acceleration level and providing a third output signal if said low frequency analog acceleration signal exceeds said second analog reference signal, and otherwise providing a fourth output signal;

and wherein the logic operation step further includes performing the logic operation upon the third and fourth output signals and providing the airbag deployment signal therefrom.

30. The method of claim 27 further including the steps of:

comparing the analog acceleration signal to a third analog reference signal corresponding to a first acceleration level and providing a fifth output signal if said analog acceleration signal exceeds said third analog reference signal, and otherwise providing a sixth output signal; and comparing the low frequency analog acceleration signal to a fourth analog reference signal corresponding to a second acceleration level and providing a seventh output signal if said low frequency analog acceleration signal exceeds said fourth analog reference signal, and otherwise providing an eighth output signal;

and wherein the logic operation step further includes performing the logic operation upon the fifth, sixth, seventh and eighth output signals and providing the airbag deployment signal therefrom.

31. The method of claim 30 wherein said first, third, fifth and seventh output signals correspond to high level output signals, and said second, fourth, sixth and eighth output signals correspond to low level output signals.

32. The method of claim 30 further including the step of passing a conditioned analog accelerometer signal through a second low pass filter to provide the analog acceleration signal.

* * * * *